Dec. 23, 1947.     O. K. KELLEY     2,433,052
COMPOUND POWER TRANSMISSION
Filed Sept. 6, 1943     5 Sheets-Sheet 2

Inventor
Oliver K. Kelley

Dec. 23, 1947.   O. K. KELLEY   2,433,052
COMPOUND POWER TRANSMISSION
Filed Sept. 6, 1943   5 Sheets-Sheet 3
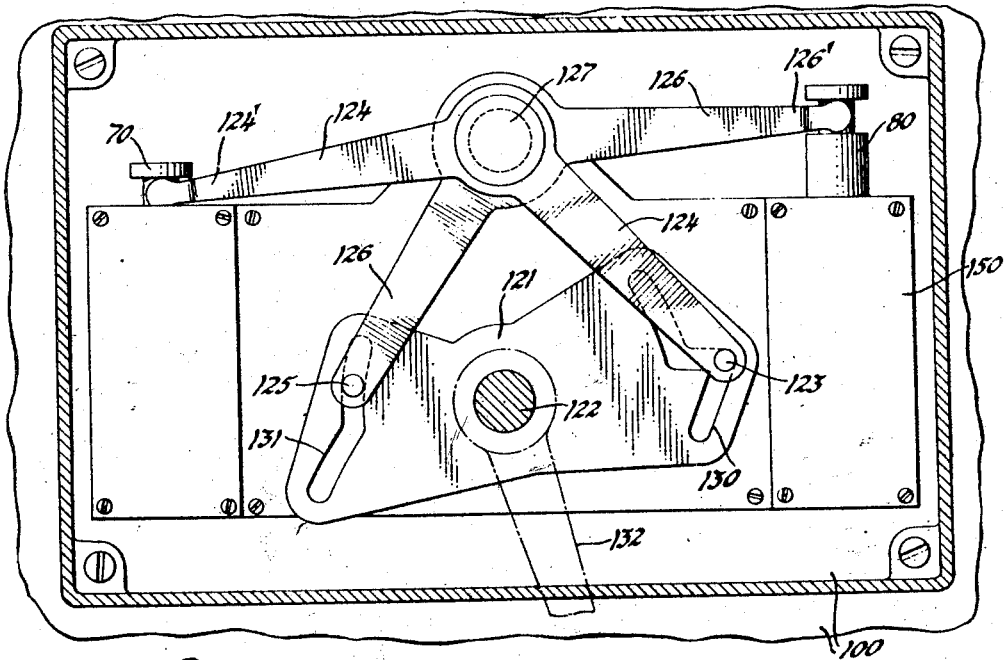
Fig. 7
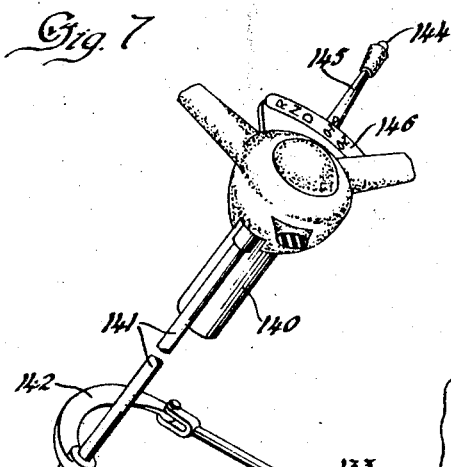
Fig. 8
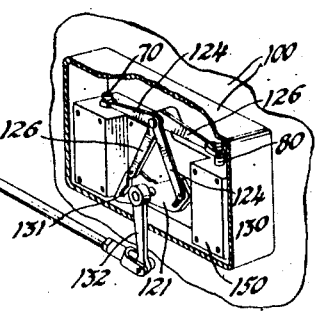
Inventor
Oliver K. Kelley
By
Attorneys Dec. 23, 1947. O. K. KELLEY 2,433,052
COMPOUND POWER TRANSMISSION
Filed Sept. 6, 1943 5 Sheets-Sheet 4

Inventor
Oliver K. Kelley
By Blackmore, Smeart & Flint
Attorneys

Dec. 23, 1947. O. K. KELLEY 2,433,052
COMPOUND POWER TRANSMISSION
Filed Sept. 6, 1943 5 Sheets-Sheet 5

Inventor
Oliver K. Kelley
By Blackmore, Spencer & Hunt
Attorneys

Patented Dec. 23, 1947

2,433,052

UNITED STATES PATENT OFFICE 2,433,052

COMPOUND POWER TRANSMISSION

Oliver K. Kelley, Birmingham, Mich., assignor to General Motors Corporation, Detroit, Mich., a corporation of Delaware Application September 6, 1943, Serial No. 501,389

20 Claims. (Cl. 74—189.5)

The present invention relates to power transmissions for heavy duty purposes, especially for those in which the engine drives through torque-converting mechanisms and gearing always indirectly and without being positively coupled at unitary speed with the load shaft. This method of drive is adapted to tractors, mining gear, oil-well drilling machines, excavators, military vehicles and the like, and is of especial reference to power plant assemblies in which the engine torque can best be handled by coupling the engine through torque-converting means, stepping up the intermediate speed ratios into overdrive or overspeed ranges, and stepping down to required final drive speeds through transfer gearing of differential or similar types.

In order to make full utility of the efficiency of a torque-converter having a definite, efficient infinitely-variable speed ratio range, the present invention contemplates the use, in combination, of a power source having relatively high torque available at lower speed ranges, which may be a Diesel or steam engine; in operating that or other engine at or near its peak torque, while allowing the torque-converter driven by the engine to deliver an output torque in accordance with the prevailing rotor load and speeds of the impeller; and changing the net speed ratio between the torque converter and the load shaft with a gearing device providing direct coupling, and two faster geared speeds.

With this regime it is possible to maintain the power plant at nearly constant speed, at approximately peak torque, since in the drive between engine and load shaft, if there is no interruption in torque for ratio shift purposes, the engine need never be throttled, after the load shaft has been put in motion, except for stopping. The stall speed of the torque converter may be nearly equal to the maximum allowed speed of the engine, so that with proper design of the torque converter unit, a highly efficient use of engine and torque multiplier is made, the torque converter being always operated at speeds approaching and not exceeding its maximum torque capacity. In the example to be given in the present specification, the torque converter has a useful speed ratio range of from one-to-six up to one-to-two, input to output. As shall be demonstrated, this ratio range superimposed upon that of the gearbox in series with the torque converter unit, provides a net ratio range between engine and output of high flexibility and torque-handling ability.

The power-developing and controlling methods shown herein will appear unorthodox to inventors of conventional drives, but there are substantial reasons for the novel arrangement disclosed. The fluid torque converter as a power-handling unit provides automatic starting and stopping of a vehicle by reason of its low torque at idling input speed, and it provides automatic, continuously-variable speed ratio over a range of ratios at fairly high efficiency, but loses efficiency as its speed ratio approaches 1 to 1. Orthodox reduction gear drives in series with torque converters of this type do not combine the efficient ranges of such gear drives with the efficient range of fluid torque converter drives; for lugging heavy loads at maximum, peak engine torque, since all step-ratio gears are less efficient, proportionally to the degree of reduction, than when in direct-coupled drive. Furthermore, such reduction gear and torque-converter combinations are not adaptable to dual power-plant, track laying drives, experience teaching that in reduction, epicyclic gears, having low differential or reaction brake factors, the glaze and chatter effects are pronounced, and excessive wear occurs, thus accelerating the service time and cost; and, in the case of the military vehicle, impairing the continuity of utility.

The present invention therefore provides a high efficiency, "low" ratio for drive with the fluid torque converter operating at best efficiency for pulling a heavy load, the engine being at maximum, or peak torque, and is especially adaptable because of its use of overspeed gearing between the engine-driven torque converter and the transfer, reduction gear driven by the gearing, since the reaction brake factor in an overspeed gear as described herein is high, therefore the risk of chatter and torque shock is relatively nil. The invention also provides simple control means for actuating the ratio-establishing structures of the driving mechanism disclosed; and shows how these means are to be used for emergency braking of the vehicle. These and other advantages will appear in the following specification describing the accompanying drawings, briefly characterized as follows:

Figure 1a is a section of an input drive gear for the structure of Figure 1.

Figure 7 is a side-elevation view of a control valve box for the two valves of Figure 3, with the mechanism for positioning the valves for establishing the various of the assembly of Figure 1.

Figure 8 illustrates a typical vehicle control installation for one of the assemblies of Figure 1, with levers, shafts and rods external to, and for shifting the mechanism of Figure 7 to operate the valves of Figure 3.

Figure 1:
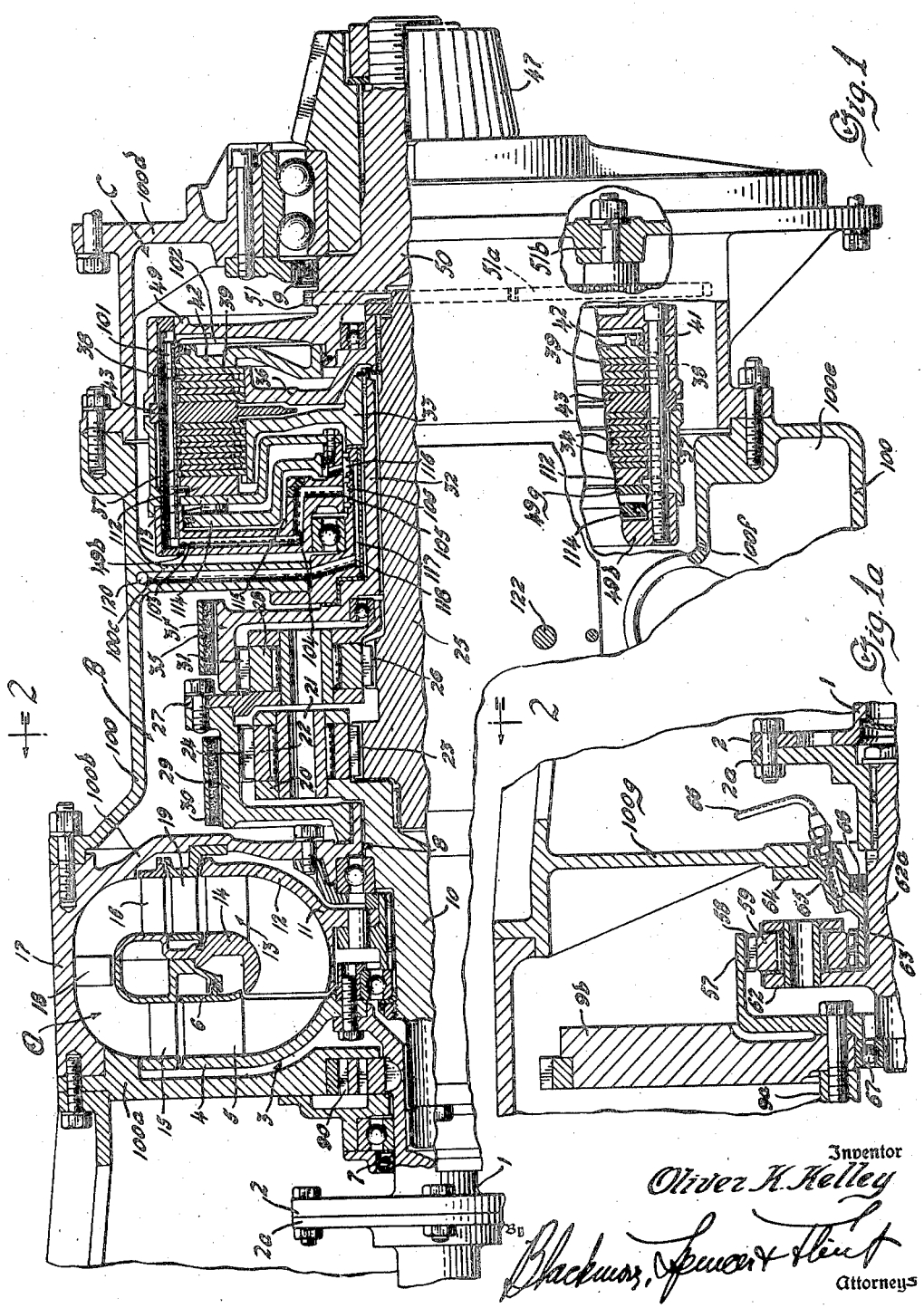
Figure 1 is a longitudinal elevation section through the transmission assembly of the invention, the letters A, B and C denoting the compartments in the casing for the torque converter, the gearing unit and the coupling clutches, respectively.

In Figure 1, the input or power shaft 1 is connected directly or indirectly to an engine, by flange 2, supported in the casing 100 by appropriate bearings and is bolted to impeller unit 3 of the torque converter. The impeller 3 is made up of shell 4 to which a series of blades 5 is affixed, supported by ring 6.

The turbine output shaft 10, supported in the casing 100 by proper bearings is splined to the turbine output member 11 made up of shell 12 with affixed blades 13 and core ring 14 which in turn carries blades 15 and 16. The output rotor therefore has three courses of blades 13, 15 and 16. A stator member 17 of the non-rotating casing 100 has two sets of blades 18 and 19 as reaction means for the turbine action of transmitting multiplied torque.

In this device there are three transfers of torques. The spinning impeller 3 imparts a component to blades 15. The movement of fluid through the reaction or guide blades 18 imparts a forward component to blades 16, and the reaction effect of motion through blades 19 applies a further component to blades 13.

By selected design of the parts, the available range of torque-multiplying characteristics of the unit may be chosen to suit the needs of the particular vehicle to which the turbine device is fitted. In the present installation, for reasons which will be later understood, a speed ratio reduction range through the torque converter unit providing a maximum of 1 to 6 is desirable.

The turbine output shaft 10 extends to the right in Figure 1, and is formed to support the spindles 21 of planet gears 22 of the overspeed and reverse gear unit, of double reduction type, the flanging and spindle support ring acting as a carrier 20.

The turbine unit is required to operate at a given filling of liquid, and seals 7 and 8 assist in maintaining the pressure level in the working space. The unit may use the oil from the transmission casing, or an independent supply, as desired. The unit shown herein is arranged to be maintained under a static pressure head when it is delivering driving torque.

The fundamental principles of the fluid turbine torque converter are shown in Letters Patent to Föttinger, U. S. 1,199,359, issued September 26, 1916, and are not deemed necessary of further description in this specification. Other forms of continuously-variable torque converters may be used in my inventive combination.

The present invention combines the torque converter drive with gearing in a way believed novel, and for definite purposes, as will be further disclosed. This combination provides an unusual power plant output, especially for heavy vehicles in the drive of which the engine is never connected directly at unit speed with the output shaft.

The following description covers the overspeed and reverse drive gearing combined with the fluid torque converter, by way of example.

The power input member of the double reduction gear unit is carrier 20 for the planet gears 22 of the primary group, which mesh internally with sun gear 23, and externally with annulus gear 24. The transmission shaft 25 is fixed to sun gear 23, to sun gear 26 of the secondary group, and is attached to splined clutch drum 36, upon which clutch plates 39 are slidingly mounted.

The carrier 27, for planets 28 of the secondary group is attached to annulus gear 24 of the primary group, and its drum 29 has an external surface upon which brake 30 may be clamped. Planets 28 mesh internally with sun gear 26 and externally with annulus gear 31, fixed or integral with hollow shaft 32 of splined clutch drum 33, the external surface of the annulus gear 31 being brakable by brake 35.

The load, or output shaft 50 carries overhanging drum 40, supporting the sets of clutch plates 37, and 38, mating with plates 34 and 39 respectively of drums 33 and 36.

There can be no drive between shafts 10 and 50 until an energisation of a combination of at least one brake and one clutch or both clutches is accomplished.

To initiate drive, both clutches 34—37 and 38—39 are energised, a locking couple being established across annulus gear 31 and sun gear 26, and across annulus gear 24 and sun gear 23. This provides 1-to-1 drive ratio between shafts 10 and 50.

To obtain the next highest speed ratio, clutch 34—37 is released and brake 35 applied to drum 31' of stopping rotation of annulus gear 31 of the secondary group. The rotation of shaft 10 and carrier 20 causes planet gears 22 to rotate forwardly faster than the transmission shaft 25, and applies a component forwardly on annulus gear 24 and carrier 27 of the secondary unit. The component on carrier 27 reacts from annulus gear 31 to drive sun gear 26 and shaft 25 forwardly, at overspeed.

The peculiar ratio effects obtainable by combinations of double reduction gearing are not widely known, are somewhat difficult to grasp, and in explaining clearly how the ratio effects herein are obtained, it is believed useful to state something of the theory on which the unique drive mechanism described herein is based.

The available engineering manuals do not provide instructions for calculating directly the ratio functions of double reduction planetary gear units. To estimate these factors, it is required first, to figure the groups separately, and to superimpose from one to the other, the added characteristic derived from rotation of the secondary upon the primary.

For example, in the Figure 1 presentation, it being desired to know the speed ratio of shaft 25 to shaft 10, arbitrary values are first assigned the different gear elements, and the net ratios of the unit then calculated.

The pitch diameters or numbers of teeth of the elements may be used to obtain the ratios, in a commonly known manner.

Assuming the sun gears 23 and 26 to have the same diameters, the annulus gears 24 and 31 to have the same diameters, by assigning arbitrary tooth or diameter values of 2.0 to the sun gears and 6.0 to the annulus gears, the ratio between shafts 25 and 10 may be simply calculated by turning shaft 25 one turn, and deriving the fundamental component applied to shaft 10 through the primary gear group, with sun gear 23 as the driver, and annulus gear 24 held. This component will be a value represented by the sun gear diameter divided by the sum of the annulus and ring gear diameters, or 2÷8, which equals 0.25.

The added component derived from rotation of annulus gear 24 because of it being attached to carrier 27 of the secondary group is found by figuring the rotation effect on carrier 20 with one turn given to annulus gear 24 with sun gear 23 held, and multiplying that by the actual component applied to carrier 27 through rotation of sun gear 26 of the secondary group, reacting from the annulus gear 31 held against rotation.

One turn of annulus 24 with sun gear 23 temporarily held, in the primary group, would give a value equal to the annulus diameter divided by the sum of the annulus and sun gear diameters, or would be equal to 6÷8 or three quarters, 0.75. But since the annulus does not make one turn, but makes a fraction thereof, conditioned by the interaction within the secondary group, identical with that first given which yielded 2÷8 or 0.25, the incremental component applied to the annulus gear 24 of the primary group, derived from the secondary group is one-fourth of three-fourths or three-sixteenths, which is to be added to the primary component of one-fourth to achieve the net rotation of carrier 20 and shaft 10 for 1 rotation of shaft 25 with annulus gear 31 of the secondary group held by brake 35.

The net rotation of shaft 10 is therefore seven-sixteenths for one turn of shaft 25, or 0.4375. Conversely for one turn of shaft 10, shaft 25 is turned at overspeed 2.286 times. As explained further, this ratio is "Overspeed—1."

Now with a simple planetary gear interaction in the primary group, with brake 30 held only, and brake 35 not held, the secondary group takes no part in the ratio determining action at all. From the above, we found that with a simple planetary relationship, one turn of shaft 25 gave one-quarter turn to shaft 10, so conversely, for one turn of shaft 10 the shaft 25 would rotate at overspeed 4.0 times.

Thus by merely shifting actuation from brake 30 to brake 35, while retaining clutch 38—39 engaged, the shaft 25 can be driven at 2.286 overspeed ratio, and be speeded up to an overspeed ratio of 4.0. When this occurs, since annulus 24 and carrier 27 are held from rotation, the idling annulus gear 31 and attached shaft 32, clutch drum 33 and plates 34 spin backward freely. This ratio is "Overspeed—2."

"Downshift" to first overspeed from second overspeed is as easily accomplished by releasing brake 30 and actuating brake 35, and return to direct coupled drive may be then obtained by releasing brake 35 and engaging clutch 34—37.

In setting up the controls for this power transmission, it is not necessary to declutch one or both of the clutches 34—37 or 38—39. It should be observed that with either one of the clutches disengaged, no torque can flow while both brakes are released, even if the engine is idling fast enough to apply a torque to shaft 10. There can be no torque component applied to shaft 50 unless two of the brake or clutch members are engaged or locked.

This unusual arrangement is of utility, in that the controls, for example, may be set up so that during direct, reverse or neutral, clutch 34—37 need not be declutched at all, therefore simplifying the ratio selection pattern.

The following ratio pattern, as an example, will make the above statements clearly understandable, the symbol * indicating units actuated:

|  | Brake 30 | Brake 35 | Clutch 34-37 | Clutch 38-39 |
|---|---|---|---|---|
| Reverse | (*) |  | (*) |  |
| Neutral |  |  | (*) |  |
| Direct |  |  | (*) | (*) |
| Overspeed (1) |  | (*) |  | (*) |
| Overspeed (2) | (*) |  |  | (*) |

*Not necessary to release for neutral.

Provided the idling engine speed is low enough to prevent creep, the operator may leave the ratio control in "Direct" when coming to a stop, obtaining drive by merely increasing engine speed with the accelerator pedal to a torque value capable of overcoming the load. Under extreme operating conditions an immediate shift from "Overspeed—2" to "Reverse" may be accomplished by release of clutch 38—39 and actuation of clutch 34—37.

For the transition from "Direct" to "Overspeed—1;" in the prior condition, all transmission elements are rotating at unit speed, brakes 30 and 35 being released. The clutch 34—37 is then released and brake 35 applied. The braked parts 31—32—33 come to rest, and the shaft 25 and sun gears 23, 26 increase speed ratio to 2.286 faster than shaft 10, the intermediate gear elements also speeding up.

Drive in "Overspeed—1" may continue indefinitely. It must be remembered that the fluid turbine unit may be operating over a ratio range of 0.167 to 0.5, so that the net overall ratio range between shafts 1 and 25 may vary in "Overspeed—1" from 0.38 to 1.143.

Shift to "Overspeed—2" requires release of brake 35 and actuation of brake 30. The annulus gear 24 and carrier 27 must be brought to rest while annulus gear 31, shaft 32 and drum 33 must be started into motion and accelerated reversely at some ratio to that imparted to sun gears 23 and 26 and to shaft 25. Conversely, downshift to "Overspeed—1" requires resetting of brake 35, with release of brake 30, speeding up elements 24, 27 while bringing 31, 32, 33 to rest.

It will be noted that considerable inertia values exist on the parts which idle during and after these transitions, so that the inertia absorption needed to complete a ratio transition may require a time lag to avoid building up high shock stresses on the shafting and critical load points. It is therefore desirable to provide inertia absorption means in the brakes 30 and 35 operative over sufficient time to avoid such stressing, and further, to so phase the actuation interval for one with respect to the release of another, that a constant minimum torque value is maintained during the ratio transitions, for the purpose of preventing an idle rotating element from running free, to reduce the possibility of shock loading, and maintain efficient drive through the torque converter.

The prior art discloses control systems adapted for this purpose in which fluid servo actuation pressure means are arranged to yield torque overlap, during the ratio shift interval, by beginning the application of pressure to one clutch or brake selected to assume the drive or reaction, before the pressure is relieved from that one selected to release the drive or reaction.

The Letters Patent U. S. 2,193,304 to E. A. Thompson, issued March 12, 1940, describes this type of control, and also Letters Patent U. S. 2,204,872 to E. A. Thompson, issued June 18, 1940, it being obvious that the systems of control shown in these patents may be adapted in part to operate the structure of the present invention.

To obtain reverse speed ratio, as noted above, it is necessary to lock brake 30, free clutch 38—39 from drive, and transmit the drive to shaft 50 from annulus gear 31 through clutch 34—37. Locking of brake 30 stops rotation of annulus gear 24 and carrier 27. Rotation of carrier 20, with the arbitrary dimensions used herein by way of example, causes planet gears to roll around the inside of annulus 24, imparting an overspeed to sun gear 23, the value of which, for one turn of carrier 20, is equal to 6.0 plus 2.0 divided by 2.0, or 4.0, as noted preceding in connection with the explanation of "Overspeed—2." This rotation being imparted to sun gear 26, with the carrier 27 held, rotates annulus gear 31 backward at a value equal to 2÷6 for one turn of 26, or to one-third times 4, or 1 and one-third turns of shaft 50 in reverse for one turn of shaft 10.

The utilization of the disc clutches located at the delivery end of the transmission assembly remote from the fluid turbine torque converter provides a neat, close-coupled power transmission unit, capable of ready adaptation to special purpose vehicles of all types, military or otherwise.

The output shaft 50 is supported in casing 100 by a large double-row bearing, and carries splined pinion which will gear with larger diameter differential or other transfer gearing for applying the power plant torque to the final drive, wheels, tractor bull rings and the like.

As will be understood from the ratio shift pattern given preceding, it is required that the actuation controls be able to load both clutches 34—37 and 38—39, and actuate them individually with the other released.

For this purpose, fluid pressure is admitted to press the clutch plates together, release of which permits the clutches to disengage, as is described further herein.

Figure 2:
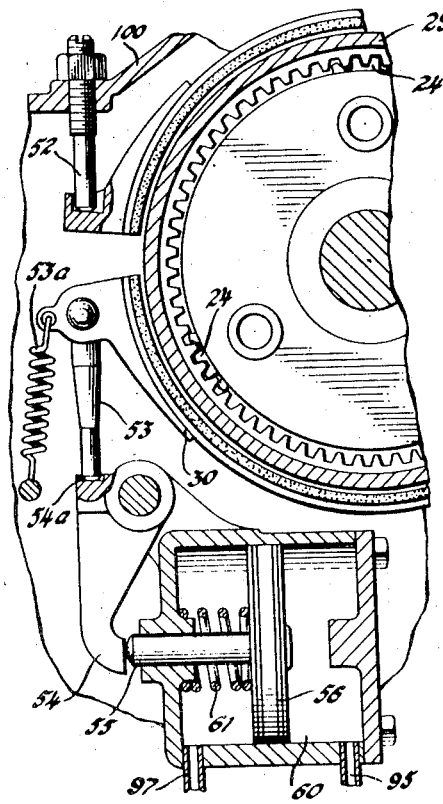
Figure 2 is a part section at 2—2 of Figure 1, showing a typical actuation control for one of the ratio-determining brakes of Figure 1. A similar view could be made for the second of the two brakes.

Figure 2 is a part section taken at 2—2 of Figure 1, for showing the method of actuation of both of the brakes 30 or 35, the Figure 2 section referring to the actuation for brake 30. The casing 100 is tapped and threaded to accommodate adjustable brake anchor bolt 52. The movable end of brake 30 is pivoted to thrust rod 53 seating in notch 54a of bellcrank lever 54 pivoted on the casing, the long end of which bears against piston rod 55, because of the tension of brake release spring 53a.

Brake cylinder 60 is fitted with piston 56 and rod 55, the pipes 97 and 95 feeding actuation pressure to either end of the cylinder 60 for applying or releasing the brake 30. Biasing spring 61 always tends to release the band 30, similarly to spring 53a, and the two springs must be overcome by the fluid pressure entering pipe 95, to shift piston 56 to the left.

Figure 3:
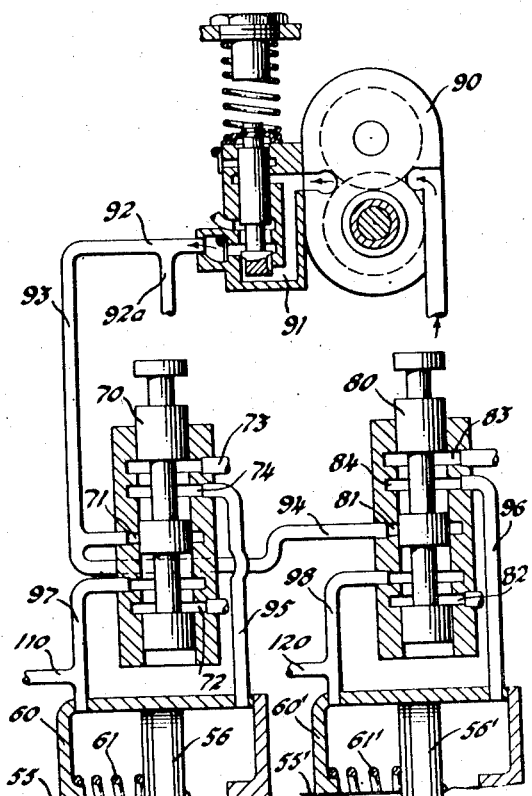
Figure 3 is a servo supply diagram of the actuation system for the brakes and clutches of Figure 1, with the valving and actuating cylinders shown schematically, and one pump unit with regulator valve for the pump line pressure.

This arrangement is duplicated for brake 35, the pressure piping being shown further in Figure 3 in conjunction with that for the clutches.

Clutch 38—39 of Figure 1 is loaded by plate 42 guided on bolts 41 similarly to plates 38, and is shifted axially to cram the plates 38, 39 against backing plate 43. Plate 42 is shifted to the left by pressure fed through transverse tubes 101 connecting space 102 with radial passage 103 and passages 104, 105 fed from gland space 106 and leading to external passage 110 in web 100c of casing 100, as shown diagrammatically in Figure 3.

Clutch 34—37 of Figure 1 is loaded by plate 112 guided on bolts 41 of drum 49, stud 113 guided in an aperture of web 49 of the drum, and flanged member 114 shiftable by fluid pressure fed into the spacer 115 between web 49b and member 114 from passage 116, gland passages 117 and 118, and external passage 120 in web 100c of casing 100.

Member 114 and plate 42 act as annular pistons, in loading the clutches 34—37 and 38—39.

The location of web 100c between gear compartment B and clutch compartment C provides a long bearing support against shaft deflection and misalignment, as well as a convenient means for introducing the clutch actuating pressure.

The clutches are of multiple disc form, similar to those described in Letters Patent to O. K. Kelley, U. S. 2,176,138, issued October 17, 1939, and to E. A. Thompson, U. S. 2,193,524, issued March 12, 1940. These clutches are self-released, and assisted in releasing by conventional coil springs which are seated in the pressure plates, as is common in this art.

In Figure 1a is shown a section of the input gear which may be used for providing a permanent multiplication of torque between the engine and the torque converter input shaft.

An extension of the casing 100 is attached to the reaction sun gear 63 of a fixed planetary unit. The torque converter input shaft 1 has its flange 2 bolted to flange 2a of a jackshaft flanged at 62 to support the spindles of planet gears 59 meshing with sun gear 63 and annulus gear 58, the latter being integral with drum 57 bolted to the flywheel 9b and crankshaft end 9a. The assembly is piloted at bearing 67, and the sleeve of sun gear 63 is attached at 64 to the web 100g. Lubricant is supplied through pipe 66 to nozzle 65 as shown, leakage being stopped by seal 68 surrounding the shaft of carrier 62.

The external control passages 110 and 120 are fed by the servo pumps through valving operated in accordance with the ratio shift pattern given preceding.

The following actuating pressure requirement for these passages will make clear the method of operation:

| Ratio | Passage 120 (Clutch 34—37) | Passage 110 (Clutch 38—39) |
|---|---|---|
| Reverse | P | |
| Neutral | P | |
| Direct | P | P |
| Overspeed—1 | | P |
| Overspeed—2 | | P |

The symbol P above indicates actuation pressure existing. It may or may not be desirable to maintain pressure on clutch 34—37 when the control is set for "neutral."

The assembly of drive elements of Figure 1 is accomplished by compartmenting. The torque converter unit occupies compartment A, having web portions of casing 100, as 100a and 100b at the front and rear. Web 100c with web 100b sets off the double-overspeed gear compartment B, and the clutch compartment C is defined between webs 100c and 100d. There is no sump in the compartment A, nor in compartment C. Excess oil in the latter, finds its way back to the sump 100e through drain 100f. Seal 9 at the rear of the assembly prevents escape of liquid along the shaft 50 from compartment C.

The gear pump indicated at 90 in Figure 1 maintains a head in the torque converter, over and above filling pressure, and for lubricating the drive assembly bearings. The pump 90 may be used, likewise, to furnish fluid pressure for actuating the servo system operating the described brakes and clutches.

Further, gear 51 cut on the periphery of the flange joining shaft 50 with drum 49 may be used to drive a second pump, not shown, for taking over the work of the pump 90, in whole or in part, when the vehicle is in motion. The bottom space 100e of the casing 100 of Figure 1 is used as a sump, and may be connected to the input of pump 90 in any convenient manner, by piping or passages in the casing. The gear 51 is shown meshing with gear 51a spindled on shaft 51b supported in web 100d of the casing, the latter gear being available to drive a second pump and a governor shaft, as desired.

The open piping at the lower left portion of Figure 3, as an extension of the main pump line 92 of pump 90 may be fed from the second pump driven by shaft 50.

The arrangement of servo control and supply of Figure 3 consists of a pump 90, and regulator valve 91 ported to supply a main servo line 92, having feeder leads 93 and 94 to input ports 71 and 81 of valves 70 and 80 respectively. The valves are balanced valves having three positions, "up" for delivery of the pressure to lines 97 or 98 for causing release of the brakes 30 and 35 and actuation of the clutches 34—37 or 38—39; "down" for relief of pressure via ports 72 and 82 while energising the brakes 30 and 35, and a mid-position in which pressure drains from lines 97, 110 and 98 and 95, 96. The upward protruding stems of the valves 70 and 80 may be operated singly or together in a ratio selection pattern as provided above.

The prescribed movements have to do with the actuation control of clutches 34—37 and 38—39, and actuation or release of the brakes 30 or 35. Brake 35 is never actuated when clutch 34—37 is actuated, therefore the fluid pressure which loads this clutch may be used to hold off brake 35, the pressure feed in line 93 going to line 95 and to the right end of brake cylinder 60, of Figure 2, where the piston 56 is actuated to oppose spring 61, which normally holds the brake operating mechanism inactive. Therefore valve 70 which controls clutch 34—37 also controls brake 35. For "Overspeed—2" however, it is required to hold both brake 35 and clutch 34—37 inactive, therefore the valve 70 has this position in which it delivers pressure to brake cylinder 60 only.

The ratio requirements call for the arrangement of Figure 2, utilized for controlling clutch 34—37 and brake 35 from a single valve 70, which has three positions; one, for actuating the clutch while holding off the brake, another for releasing the clutch while permitting the brake to act, and another in which it holds off the brake.

Figure 5:
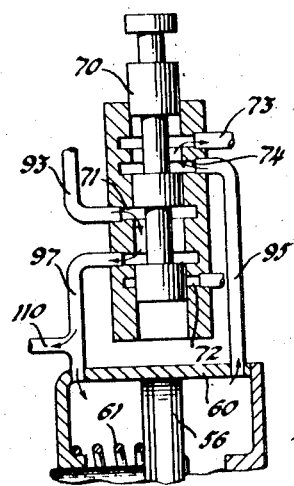

The flow of pressure from pump line 92 in Figure 3 is blocked by the central boss of valve 70, when the valve is in the mid-position. With no pressure available to actuate either the brake 35 or the clutch 34—37, spring 61 holds off the brake 35 positively, and the "Overspeed—2" condition is fulfilled. With the valve 70 in the "up" position, as shown in Figure 5, pump pressure may flow through port 71 and to lines 97 and 110 to energise the clutch 34—37 and to hold off the brake 35 positively, the liquid trapped in the rightward portion of cylinder 60 being relieved through line 95 and exhaust port 73. This is the operating condition corresponding to "Reverse," "Neutral" or "Direct," in the preceding ratio selection pattern.

Now with valve 70 in the "down" position the pump servo port 71 is open to port 74 and line 95, to provide pressure on the rear of piston 56, acting against spring 61, to energise brake 35, corresponding to the required "Overspeed—1" condition.

The valve 70 is therefore held by the external controls in the "up" position for establishing reverse, neutral and direct; is shifted to the "down" position for "Overspeed—1" and to the "mid" position for "Overspeed—2."

Referring back to the above ratio selection chart, it will be noted that a second valve to control the brake 30 and the clutch 38—39 will need to be able to establish actuation of brake 30 by itself, for "Reverse," release of both the brake and clutch for "Neutral," and thereafter actuation of the clutch for the other three forward drive conditions.

The valve 80, identical with valve 70, is used for controlling brake 30 and clutch 38—39; in the "down" position for "Reverse," in the mid-position for "Neutral" and in the "up" position for all forward driving.

The ratio shift pattern given below will provide a clear summary of the required valve positionings:

| | Valve 70 | Valve 80 |
|---|---|---|
| Reverse | up | down |
| Neutral | up | mid |
| Direct | up | up |
| Overspeed—1 | down | up |
| Overspeed—2 | mid | up |

Figure 4:
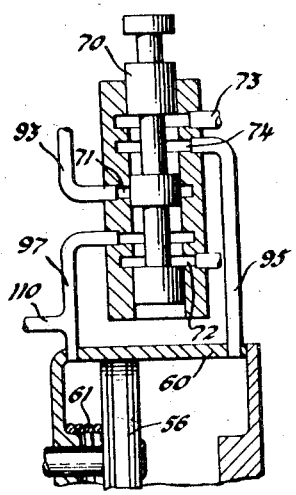
Figures 4, 5 and 6 are provided to show the three ratio control positions of one of the valves of Figure 3, and its effect upon the actuation unit controlled, the heavy arrows denoting active pump line pressure and the light dashed arrows, the relief pressure.
Figure 6:
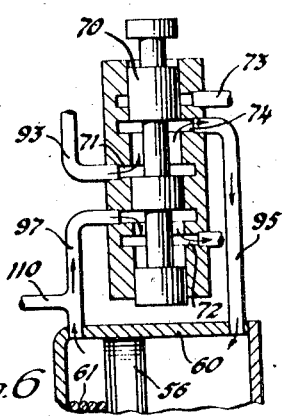

The three companion Figures 4, 5 and 6 illustrate the flow control pattern of valve 70 of Figure 3, the Figure 4 showing duplicating the position of that valve in the assembly diagram of Figure 3. In Figure 4 the valve is blocking the pump line pressure, when neither the clutch or brake are actuated. In Figure 5 the pump pressure holds the brake off while loading the clutch, and in Figure 6 the brake is applied by the pressure while the clutch pressure is relieved.

The exhaust ports and lines relieve the spent pressure back to the sump of compartment B whence the fluid is recirculated by pump 90 and another pump, not shown.

Since the actuation mechanism for brake 30 is identical with that for brake 35, the diagram of Figure 3 for the brake cylinder, piston and other parts has them marked with prime members, 60' being the cylinder, 56' the piston, 55' the piston rod, and 61' the release spring. The operation is the same for both. A duplicate showing for brake 35 like Figure 2 is not believed necessary.

External controls

A simple valve-setting means for obtaining the above shift pattern is shown in Figure 7, where a cam plate 121 rotating on shaft 122 is slotted to accommodate the pins 123 and 125 of levers 124 and 126 mounted on shaft 127 supported on valve casing 150. The slots 130 and 131 are shaped to provide the 3-positional action required, and plate 121 is rotated by arm 132 and pivoted rod 133 operated by the structure of Figure 8.

The valves 70 and 80 are shown protruding from the upper portion of the valve casing 150, and clevises 124' and 126' of the arms of the levers 124 and 126 provide positive positioning means for the three required positions of each valve.

The slot 130 of plate 121 is cut so that the intersecting pin 123 of lever 124, controlling valve 70 for brake 35 and clutch 34—37, is held close to the centerline of shaft 122 for the "up" position of the valve, and farthest from the centerline for the "down" position.

The radial lines marked "R," "N," "D," "O—1" and "O—2" Fig. 8 correspond to the "Reverse," "Neutral," "Direct," "Overdrive—1" and "Overdrive—2" positions of the valves.

The steering column 140 of the vehicle shown in Figure 8 supports shaft 141 on which arm 142 pivoted to rod 133 is fixed, the manual handle 145 attached to shaft 141 moving over sector plate 146 in accordance with the selected ratio or drive condition. The handle and sector mechanism may be made in accordance with Figures 11, 12 and 13 of Letters Patent U. S. 2,195,605 to E. A. Thompson, issued April 2, 1940. The leader action of the handle 145 of Figure 8 determines the follower action of plate 121 which positions the valves 70 and 80 for the required shift pattern.

The valve casing 150 in Figure 7 has a raised boss to act as a bearing for the valve rock shaft 127, on which levers 124 and 126 pivot. These levers may be made of inexpensive stamped parts, and also plate 121.

Various automatic methods of selection of ratio may be utilized, in which speed governors conditioned by operator throttle setting or by torque, on a dynamometric basis, may be used to shift the valving for establishing speed ratio in the arrangement of the invention.

Figure 9:
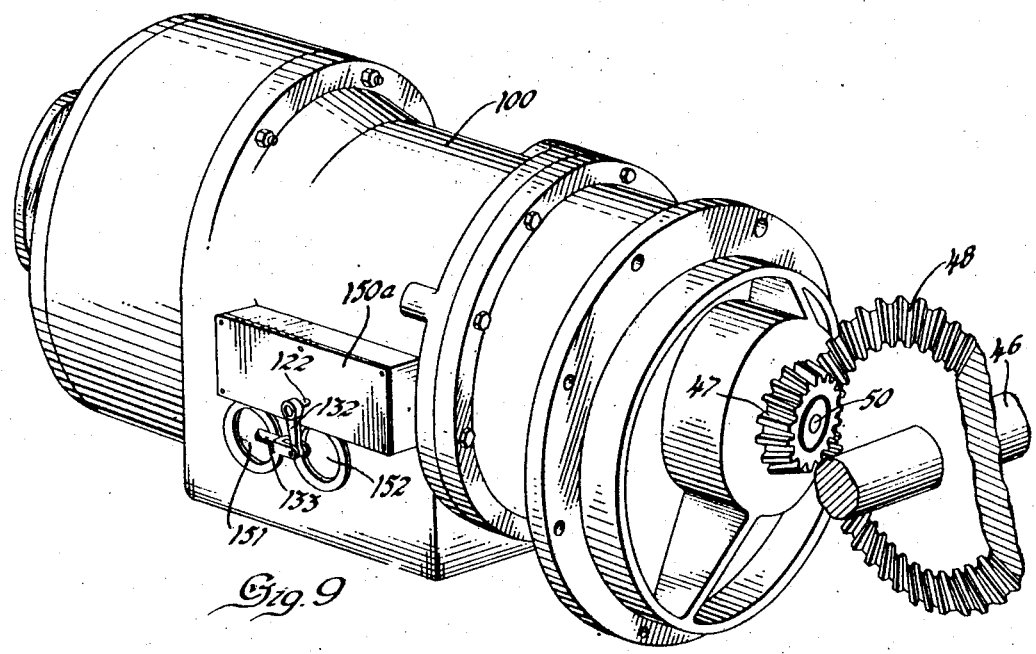
Figure 9 shows one of the assemblies of Figure 1 as it would be set up for use in a vehicle, the valve box with its cover 150a housing the construction of Figure 7; and the final drive being through a reduction gearing driven from the transmission output shaft.

Figure 9 is an outline perspective view of the transmission assembly for the purpose of showing the general relationships between the external portions of the mechanism. The valve casing 150a is bolted to the main casing 100 as shown, and supports control shaft 122 and lever 132, shifted by rod 133, and the mechanism of Figure 7. Snap plates 151 and 152 seal the casing space adjacent the brake operating mechanisms like that of Figure 2, and are readily removed for inspection and adjustment work.

The arrangement of Figure 9 may be placed as required in a standard or special purpose vehicle, with the centerline of the drive assembly coincident with that of the vehicle, parallel to it at one side, transversely placed, or in whatever position needed for the particular drive, the linkage of Figure 8 being arranged to coincide for the desired shift control through proper bellcranks and levers as called for by the adopted arrangement. It is not deemed necessary to show the final output drive other than indicated schematically in Figure 9, where the part perspective view shows the bevel gear 47 of shaft 50 meshed with larger gear 48 driving cross shaft 46 at a reduction speed to that of shaft 50, for delivering a powerful torque to shaft 46. It should be noted that the overall combustion of an engine, a reduction speed ratio fluid torque converter, a multi-speed forward increasing and reverse gear and a step-down gear is believed novel for the purpose of driving a large and heavy vehicle. This sequence of units provides a constantly coupled torque multiplier yielding infinitely variable torque over a useful speed range in which the engine may be constantly operated at its torque peak, with a selective torque multiplication gear unit for directly delivering the multiplied torque of the converter, or delivering a reduced torque at increased speed to an output shaft, finally reduced to a re-multiplied torque to the final driving gear. The sequence is:

1. Engine at maximum torque,
2. Torque converter operating from about 6 to 1 torque multiplication to about 2 to 1, continuously variable;
3. Direct and two overspeeds forward, selective: providing three ranges of torque to output, infinitely variable because of the nature of the torque converter,
4. Step down gear multiplying the de-multiplied torque of the gear unit, so that overall drive reduction suitable for heavy vehicles is obtained.

The final step-down gear of Figure 9 is not for the customary slow speed gear function, but is for the purpose of compensating for the overspeed gearing effect, since it is desirable with present-day engines to obtain an overall reduction drive range in heavy vehicles of 20 to 1, or thereabouts.

The overall reduction of 20 to 1 in the present invention is obtained with the gear unit in "Direct," the torque converter operating at the lower point of its curve, and with a final gear reduction of 3 to 1, or 3.3 to 1, easily obtainable with bevel gearing, as shown in Figures 1 and 9.

To endeavor to utilize a fluid torque converter and a common reduction gear drive unit in series with it would place a severe load factor on conventional gears, would not provide direct drive with no gear losses when the vehicle power would be called upon for sustaining maximum loads; and would be difficultly adaptable to dual drive or track-laying vehicles, due to the fact that planetary or epicyclic brakes so used, glaze and chatter at low differential reaction speeds, while these phenomena do not occur at higher differential reaction speeds. In the present invention, the unorthodox arrangement of stepdown, step-up and step-down transfer means allows the torque converter unit to operate at its best efficiency with the gearbox at its best efficiency; i. e., when there is no relative gear rotation action; and it provides a high differential reaction speed factor on the overdrive bands 30 and 35, which operate to set up all of the forward drive ratio shifts beyond initial drive when clutches 34—37 and 38—39 are first actuated.

In the foregoing description, the novel features shown include a form of drive through a fluid turbine torque converter, in which intermediate speed ratios are stepped up into overspeed ranges and stepped down to final drive ratios; a combination in which a high-torque power source may be operated advantageously at its power peak, while allowing the converter to deliver its output torque in accordance with prevailing rotor load and impeller speeds; and a combination in which the net speed ratio between the converter and the output shaft is changed with a gearing device which provides direct coupling and two faster geared speed ratios.

An advantage lies in the ability of this mechanism to maintain the power plant at its peak power, and at constant speed, in that there is no interruption of torque for speed ratio changing and consequently no de-throttling, except for stopping and starting. A further advantage lies in the fact that the design stall speed of the converter is made nearly equal to the maximum allowed engine speed, providing a match of peak efficiencies within a small speed range for both engine and converter, with the safety feature of having the combination approach, but not exceed the maximum torque capacity of the converter, which avoids the excessive churning losses of heat in the converter fluid.

As will be readily understood by one skilled in the art, these advantages are attained on a flexible operation basis, that is, the co-action effect between power plant and converter is not made rigid for just a small range of speed, but is likewise available for throttle settings and speeds under those for which the power peak and stall speed requirement are established. The period of time during which, for varying drive conditions, the effective and efficient use of these qualities is attained, is thereby lengthened, and consequently the overall utility of the torque converter, without undue heat loss is much greater than that of any known drive system for heavy, constant-pull purpose vehicle drives.

In view of the rather full description of the operation of each of the portions and units of the invention given above, it is not believed necessary to provide a detailed description of the full operation sequence, ratio to ratio. Assuming the engine driving the shaft 1 of Figure 1 idling with the vehicle stopped, the impeller of the torque converter will not provide a driving torque in that unit until the engine speed is advanced sufficiently. With the operator's handle 145 of Figure 8 in "N" position on the sector 146, the valves 70 and 80 are positioned to hold both brakes 30 and 35 from actuation, and neither clutch 34—37 or 38—39 is engaged. Movement of handle 145 to "D" positions the valving to cause actuation of both clutches 34—37 and 38—39, the brakes 30 and 35 being inactive, and shaft 25 is driven at the same speed as shaft 10. Shifting of the handle to "O—1" releases clutch 34—37 and causes actuation of brake 35, the shaft 25 being driven at an overspeed ratio with respect to shaft 10. Further shifting of the operator's handle to "O—2" on the sector 146, positions the valving to release brake 35 and to actuate brake 30, the effect of which causes shaft 25 to be driven at a higher overspeed to that of shaft 10. For reverse, the handle 145 in "R" position establishes actuation of brake 30 and clutch 34—37 with brake 35 and clutch 38—39 released, as hereinbefore described. The movement of the handle 145 through the various ratio positions may be poppeted as suggested in Letters Patent U. S. 2,195,605 mentioned preceding, in order to prevent dwell between desired selected ratio stations, and the pressure lag in the control system nullifies any undesirable passing through of a position such as valve 70 which upon shift between "Direct" and "Overspeed—1" must pass through its mid-position in which it blocks off the pump line pressure and would drain brake cylinder 60 and the pressure compartment of clutch 34—37. Too long a dwell of handle 145 between "D" and "O—1" would therefore, on the upshift, release clutch 34—37 without actuating brake 35 so that a no-drive interval would occur. Too long a dwell on the downshift would conversely release brake 35 without actuating clutch 34—37; giving a similar interval, so that undesirable racing of the engine connected parts could occur in either case, followed by a surge of torque as the brake or clutch to be next actuated on the transition, would be loaded. The inclusion of poppeting of the handle 145 for snapping over between "D" and "O—1" positions, obviates this effect, only present for the noted shift, when valve 70 makes a full stroke between its extreme positions.

The controls as described in Figure 7 do not provide for brakes 30 and 35 to be simultaneously loaded at any ratio point, since overload of the gearing and shafting would be experienced if clutches 34—37 or 38—39 were engaged when this occurred. This point will be clear upon inspection of Figure 1. With clutch 34—37 only engaged, the braking of annulus 31 by brake 35 would apply a braking force to shaft 32 and through the clutch 34—37 to drum 49 and shaft 50, to stop the motion of the vehicle: the braking of brake 30 on drum 27 would establish a locking couple across sun gears 23, 26 to carrier 20, thus slowing down rotor 11 of the torque converter. With clutch 38—39 only engaged, the locking of brakes 30 and 35 would similarly set up a locking couple on the sun gears 23, 26 imparted to drum 49 through the clutch. Assuming that in an emergency, it would be desirable to use brakes 30 and 35 for slowing the shaft 50, and that the drive parts had been designed to handle the torque loads thus created, it is clear that the use of both clutches 34—37 and 38—39 actuated together would avoid overloading of one, by distributing the braking torque on the two, therefore a control such as diagrammed in Figure 10 provides a position on the sector for handle 145 in which the brakes may be simultaneously operated.

The Figures 3 to 6 demonstration provides that each valve 70 or 80 divide the clutch actuation interval from the brake actuation interval. The Figure 11 arrangement with the Figure 10 control is a modification by which the operator by placing the handle 145 in the "D" position may operate supplementary valving which cuts into the clutch pressure lines for the clutches 34—37, and 38—39, and admits pressure to actuate both brakes. Valve 87 of Figure 10 is the equivalent of either of valve 70 or 80 of Figure 3, and exercises all of the control functions stated above for those valves. The supplementary vehicle braking control valve 78 is utilized only when a vehicle brake effect is desired, and is inactive and non-interfering at all other times. In an installation of this control the construction of Figure 3 would be replaced by two arrangements like Figure 10, one for each of valves 70 and 80, making two ratio control valves, and two supplementary brake valves auxiliary thereto, so that all four elements, brakes 30 and 35 and clutches 34—37 and 38—39 may be simultaneously actuated.

Figure 10:
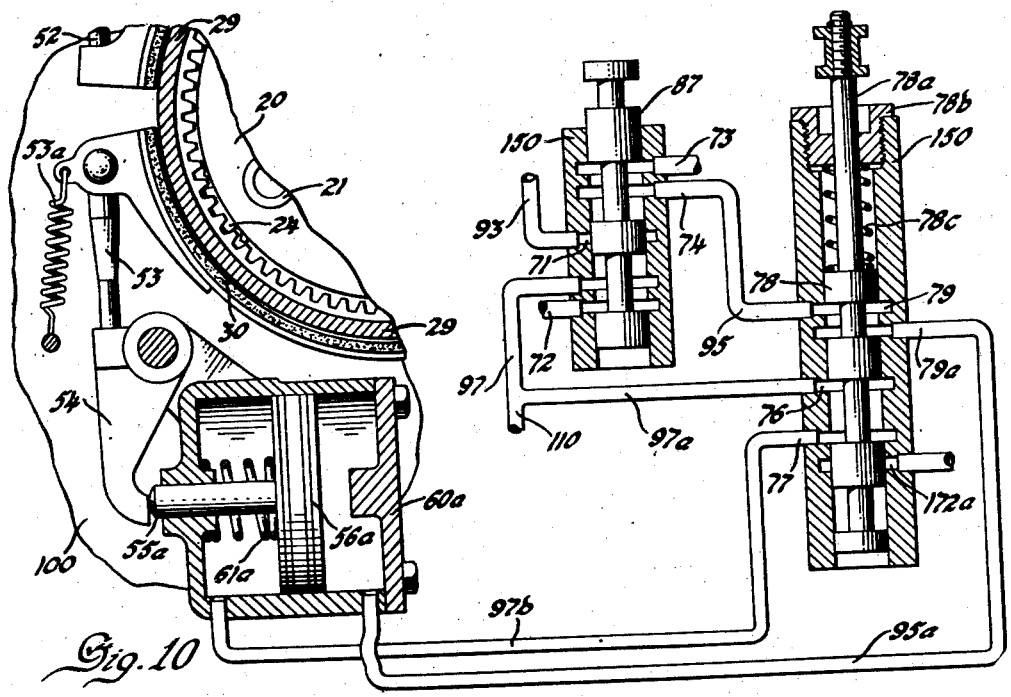
Figure 10 is a schematic showing of one of the ratio control valves of Figure 3 equipped with a supplementary valve for compelling simultaneous brake and clutch operation in the structure of Figure 1. The Figure 11 view includes fragmentary parts showings taken from Figure 2.

The supplementary braking valve 78 shown in Figure 10 compels actuation of the brake while the corresponding clutch is loaded for driving. The passage 97 does not connect directly with the left end of the brake cylinder 60a as in Figure 3, but is fed by passage 97a to port 76 of balanced valve 78, and from port 77 to the left end of the cylinder, through passage 95 instead of directly connecting the right end of the cylinder with the feed port 74, is connected through ports 79 and 79a to the right end of the cylinder.

As shown in Figure 10, valve 78 causes no interruption in the normal operation of valve 87 such as described for valve 78 of Figure 3, all of the control and actuation shifts for ratio change being the same. However, when valve 78 is raised, the feed from 97a to line 97b is shut off, and its pressure is delivered to port 79a and line 95a to the right end of cylinder 60a, to force piston 56a to the left and actuate the brake. The servo pressure in line 97 therefore actuates the clutch through line 110 and also the brake through passage 97a, ports 76 and 79a and line 95a. As valve 78 raises, its second boss from the top shuts off port 79a from line 95 so that the exhaust relief ordinarily present when the clutch is actuated is now shut off. Valve 78 has therefore two operative positions, normally "down" in non-interfering position, and "up" for simultaneous brake and clutch operation; when valve 87 is put in clutch actuation position.

The stem 78a of valve 78 protrudes through the top of the valve casing 150, threaded guide 78b serving to retain spring 78c and normally holding the valve 78 in inactive position. The valve must be pulled "up" against the action of spring 78c, to compel simultaneous brake and clutch operation.

Since the clutch feed line 110 does not have pump pressure until the valve 87 is in the "up" position, and since it is desirable to have both clutches 34—37 and 38—39 engaged when brakes 30 and 35 are energised, the vehicle braking control for this operation is best operated with the Figure 8 arrangement only when the driver's handle 145 is in the "D" position; that is, with both clutches already actuated.

To avoid trapping fluid in the left end of cylinder 60a and in passage 97b, which would oppose the application of the brake under pressure from passage 95a to the right end of cylinder 60a, the exhaust port 172a is provided to vent when the valve 78 is moved up.

Figure 11:
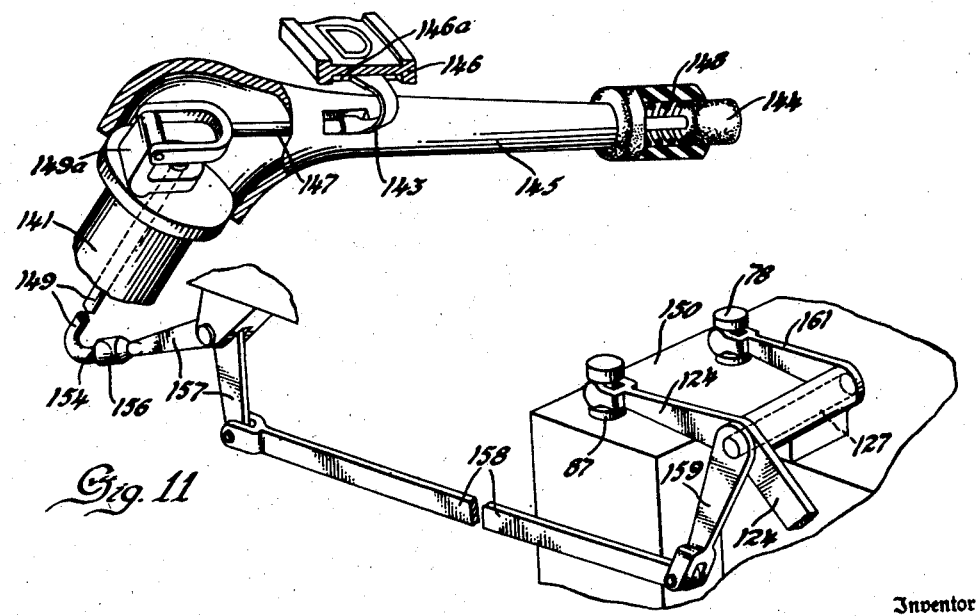
Figure 11 is a schematic projection view of the control of Figure 8 modified to operate the construction of Figure 10, and includes a fragmentary showing of some of the parts of Figure 7 in order to orient the modification with the foregoing showings.

To restrict operator abuse of the control, the handle 145 may be adapted to operate the stem of brake valve 78, the button 146 of Figure 11 being permitted to move inward flush with the head of the handle, at the "D" position, in which it causes the valve 78 of Figure 11 to rise against the action of spring 78c.

In Figure 11 a modified form of handle 145 is shown, for rocking shaft 141, different from the Figure 8 showing. The handle 145 is hollow to accommodate rod 147 and attached button 144, and is apertured at the knob for the inner portion of the button and to seat return spring 148. The crown head of the handle 145 adjacent the shaft houses the clevis end of rod 147 which is guided in the handle, and the short lever 149a is pivoted to the clevis, and has a swivel seat for the upper end of rod 149 guided in a hole drilled through the shaft 141. The lower end of the rod 149 emerges from the end of the shaft 141 and is bent to form a neck for ball head 154, fitting cup 156 of lever 157 pivoted on the framing. The other leg of lever 157 is pivoted to rod 158, which is in turn pivoted to lever 159 of shaft 127, the inner part of shaft 127 being fixed to lever 161 shown as clevised to the upper end of valve 78 of Figure 11, whose spring 78c normally holds the valve 78 in the down position. The force of spring 78c therefore tends to hold rod 158 to the right; rod 149 at its lowermost position, and therefore to augment the return action of spring 148 to keep button 144 in its outermost position with respect to the knob of the handle. A second connection from lever 157 to a rod and lever similar to rod 158 and lever 159 may be used to operate a companion valve to the ratio valve 80, the schematic view of Figure 11 only showing the linkage for the companion valve to valve 70.

When button 144 is thrust inward, rod 149 is raised by the clevis action, lever 157 rocks clockwise, rod 158 shifts to the left, levers 159 and 161 also rock clockwise, and valve 78 is lifted, which, from reference to Figure 11, causes the brake 35 and clutch 34—37 to be simultaneously actuated.

In order to assure that this action occurs only when the handle 145 is in the "D" position, a tapered lug 143 fastened to rod 147 protrudes through a window cut in the upper portion of the handle, and intersects a tapered slot 146a cut in the underside of the sector plate 146 at the center of the "D" position. Slight off-register of the handle is corrected by the taper of lug 143 and slot 146a.

This arrangement is a convenience for the operator, since while it provides braking action controlled from the same member which changes ratio, and in the case of the dual installation, which also controls steering, a separate motion, locked out against wrong action being required.

Figure 12:
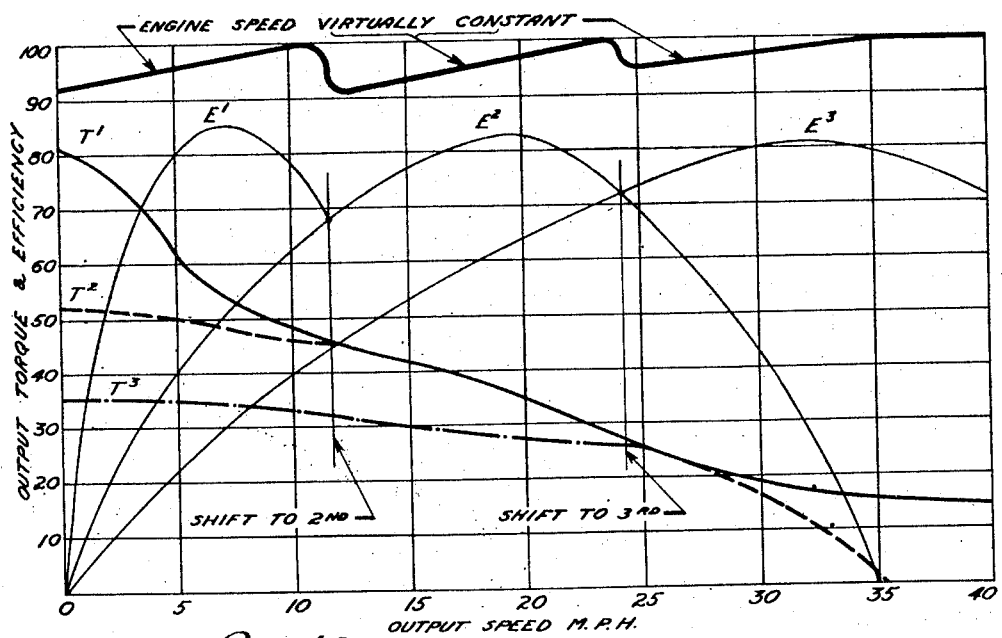
Figure 12 is a typical chart of the power results obtainable with the structures herein described.

The chart of Figure 12 is to show the relative output torque values for different operating conditions and road speeds for a typical installation.

The scale at the left margin indicates the relative efficiency in the three forward driving ratios, and the $T^1$, $T^2$ and $T^3$ curves, the corresponding output torques, while the upper black line curve represents the relative variations in engine torque. It will be observed that the recommended point of shift from low forward or direct, to second forward speed ratio comes at a point on the $E^1$ curve at which the efficiency falls below 70 percent. The recommended point for upshift to 3rd, or highest ratio O—2, is at about 24 M. P. H., where the $E^2$ curve has begun to fall off to about 72 percent. The drop in engine speed and torque at these shift intervals is quite small, since the engine inertia differential is absorbed in the torque converter, being less at the shift point for upshift to 3rd, than from direct to 2nd. The scale at the left may also be taken as proportional to tractive effort, as is known in this art. The values given in this chart are approximately correct for one specific installation, but of course will vary with different vehicles, engines and required speed for a given load.

The shift transitions may be made very quickly so that the slip interval of the clutches and brakes is quite small, since the residual inertias of rotating transmission parts behind the torque converter are of low values. As a matter of fact the timing of the valve and servo actuation of the clutches and brakes need not be restricted by the torque converter characteristics in any way, since the automatic readjustment of speed ratio within the torque converter occurs in accordance with its speeds and torques, which during the shift interval are not sensibly varied until the torque paths have been reestablished in the newly established ratio.

The herein described features of novelty are believed to be especially adapted to the drive and to the control of large heavy land vehicles and similar apparatus, and provide special advantages in structure, arrangement, safety and convenience of control, not before revealed in the prior art.

The foregoing demonstration of transmission mechanism and controls is a complete description of a working device in accordance with the present invention, by way of example, and it is to be expressly understood that the invention is not to be limited strictly thereto, but that various changes in detail, design and in construction and arrangement may be made without departing from the spirit and scope of the invention as set forth in the appended claims, wherein I claim:

1. In power drives, an engine shaft and a load shaft, a variable speed ratio gear unit coupling said shafts, said unit including input and output members coupled by gear elements with reaction-members and having plural clutch means energizable for individual or plural connection between a fluid turbine drive mechanism driving said unit and said load shaft, an arrangement of said input and output members, said gear elements and reaction members adapted to provide reverse, low-direct drive and overspeed ratio drive, brake means for the said torque reaction members energizable for individual operation to establish both forward and reverse drive of said load shaft, actuation means for said clutch and said brake means, and controls for said actuation means operable in a shift pattern requiring the actuation of one clutch of said clutch means with one brake of said brake means for an overspeed forward drive by said gear elements and the same brake with another of said clutches for reverse drive by said gear elements and providing simultaneous actuation of two clutches of said clutch means for low ratio direct drive of said unit.

2. In the construction described in claim 1, the sub-combination of manually-controlled operating means having a coacting linkage with said actuation means and with said controls effective to provide normal forward speed ratio changes within said shift pattern while maintaining uninterrupted torque between said engine and said load shafts.

3. In power transmitting variable speed ratio devices, a power shaft and a load shaft, a planetary gear unit coupling said shafts and adapted to provide a plurality of forward overspeed ratios, direct drive and reverse drive, thru gearing having plural gear output members, said gearing of said unit including an input member and with reaction members adapted to establish reaction torque for transmitting drive thru the said gearing, said overspeed ratios being established by a pair of actuatable coupling clutches adapted to connect said load shaft to said output members, a pair of actuatable reaction brakes for said reaction members, actuating means for said forward overspeed clutches and for said brakes, controls for said actuating means arranged for shift to reverse, to direct and to forward overspeed positions, and operating means for said controls operable to provide said shift positioning and operable such that for the controlled transition of said controls between reverse drive and forward direct drive one of said pair of brakes and one of said clutches of said pair of clutches are alternately engaged or released by manipulation of said operating means.

4. In power transmissions, an engine shaft, a load shaft and driving mechanism coupling said shafts including a planetary gear unit providing direct drive, two overspeed ratios and reverse drive, said unit consisting of input and output members coupled by gearing including reaction members and having actuatable clutches connecting said load shaft with the output members of said unit and two brakes connected to stop the reaction members of said unit and alternately actuatable for establishing one or the other of the said two overspeed ratios, actuating means for said clutches and brakes, control means for said actuating means, and operating means for said control means connected to shift the same in a pattern of connection effective to cause said actuating means to hold one of said clutches engaged while alternating the actuation of said brakes for establishing one or the other of said two overspeed ratios.

5. In power transmissions, an engine shaft, a load shaft, driving mechanism coupling said shafts including a gearing unit providing direct drive, reverse drive and higher and lower overspeed ratios, said unit comprising input and output members coupled by gear elements including reaction members, a pair of clutches adapted to connect said load shaft with two of said gear elements, brakes operable to stop said reaction elements of said unit, actuating means for said clutches and brakes, control means for said actuating means having stop positions for direct, reverse and for said overspeed ratios, and operating mechanism for said means operative such that the driving speed ratio of said unit may be quickly changed from the said highest overspeed ratio to reverse by release of engagement of one of said clutches and actuation of the other of said clutches, through the shifting of said control means from one said overspeed ratio position to the other.

6. In power transmissions, a power shaft and a load shaft, driving mechanism coupling said shafts including a gearing unit adapted to provide a plurality of step ratio speeds including direct drive, overspeed and reverse, said unit comprising input and output members coupled by gear elements and torque-reaction sustaining members and including a plurality of actuatable coupling clutches connected to gear elements thereof and reaction brakes arranged to stop the reaction members thereof, fluid pressure actuators for said clutches and brakes, fluid pressure valving controlling the application of pressure to said actuators, including two valves each having end-point and central positions for determining the actuation of said clutches and brakes in accordance with a predetermined ratio shift pattern, and operating mechanism for said valving which provides direct drive by said clutches with both valves in the same end-point position while all other ratios are determined with the valves in other than the same positions.

7. In power transmissions, an engine shaft and a load shaft, power transmission mechanism coupling said shafts including a gearing unit providing a plurality of overspeed ratios, direct and reverse drive, said unit consisting of a power input member, power output members and reaction members with gearing adapted to couple said shafts and having a plurality of output coupling clutches and reaction brakes operative upon said reaction members, said clutches and brakes being selectively operable to provide said overspeed ratios, direct and reverse drive, fluid pressure actuating means for said clutches and brakes, the said actuating means for said clutches being operable to engage at least two of said coupling clutches alternatively, control valving for said means including means to supply fluid pressure through at least two pressure delivery passages, and operating mechanism for the positioning of said valving such that in direct drive the fluid pressure is admitted to the actuating means for both said clutches, and that in reverse or first overspeed ratio the valving is positioned to admit fluid pressure to the clutch actuating means alternately.

8. In power drives, an engine shaft and a load shaft, a power train coupling said shafts including a gearing unit consisting of power input and output members connected by gear elements having reaction members and having two ratio-determining reaction brakes operative upon the reaction members thereof, and a plurality of clutches coupling said gear elements to said load shaft, the arrangement providing reverse, direct and a first and a second overdrive ratio between said shafts, actuation means operable by fluid pressure to energise said clutches and brakes, fluid pressure valving for said means, control means for said valving effective to establish fluid pressure in a predetermined shift control pattern for sequential shift from reverse to direct, direct to first overdrive, and first overdrive to second overdrive by selective actuation of said clutches and brakes, and a supplementary valve operable by said control means when placed in the direct drive selecting position to cause vehicle braking as may be required in an emergency, established by actuation of both said brakes.

9. In power drives for vehicles, an engine, a final drive shaft, a fluid torque converter driven by said engine and connected to transmit power to said shaft through a planetary gear unit driven by said torque converter and providing a plurality of speed ratios including reverse, direct and two overspeed drive ratios, said unit comprising power input and output members potentially coupled by gear elements with reaction members and including a first and a second reaction brake operative upon the reaction members of said unit and a first and a second coupling clutch connected to the gear elements thereof; actuation means for said clutches and said brakes; and control means for said actuation means providing a reverse gear drive by requiring actuation of said first named brake and said first named clutch, providing a direct drive by requiring actuation of both said coupling clutches, providing a first overspeed by requiring actuation of said second named brake and said second named clutch, and providing a second overspeed by requiring actuation of said first named brake and said second named clutch.

10. In vehicle driving devices, an engine, a reduction gear drive driven by said engine and driving a variable speed transmission assembly which includes a primary fluid torque converter unit, a secondary overspeed gear unit changeable to provide direct drive and a plurality of overspeed ratios with a final reduction drive connected to the vehicle propelling means, the drive mechanism of said unit including input, output and reaction members coupled by constantly meshed planetary gears with torque-reaction sustaining and torque coupling members equipped with actuatable friction means for establishing selected drive ratios between said final drive and said converter unit, and manual ratio selection means for controlling the said actuatable friction means of said overspeed unit effective to establish a plural range of forward driving speed ratios in said overspeed unit with the fluid torque converter operating at its maximum torque capacity.

11. In vehicle propelling mechanism, an engine providing a relatively high torque over a driving range of predetermined low speeds, a reduction gear drive driven by said engine and driving the impeller of a fluid torque converter at reduced speeds to those of said engine and being operable at maximum efficiency over the said driving low speed range of said engine, fixed reaction guide means and an output turbine member included in said torque converter, a planetary gear unit driven by the output member of said torque converter and driving a driven shaft, said unit consisting of power input and output members coupled by gear elements with a plurality of reaction members, and provided with a plurality of actuatable friction members for stopping the rotation of said reaction members and coupling the gear elements of said unit with said driven shaft, the arrangement being effective to establish a plurality of forward overspeed step ratios in said gear unit, a final drive reduction gearing driven by the driven shaft of said gear unit, and control means for selecting the actuation of said members in a plurality of actuation combinations thereof whereby the drive in the selected forward speed ratios proceeds at maximum torque capacity of said fluid torque converter and under high torque of said engine.

12. In power control devices, an engine shaft and a load shaft, fixed reduction gearing driven by said load shaft, variable speed ratio driving mechanism coupling said shafts including a reduction gear driven by said engine for driving a fluid torque converter providing driving output shaft speeds of approximate one-to-six ratio to the speeds of said engine, a step-ratio gear unit driven by said converter and driving said first-named reduction gearing comprising planetary gearing consisting of power input and output members coupled by gear elements with reaction-supporting members and having plural reaction-sustaining brakes and plural coupling clutches connecting said load shaft with gear elements of said unit and actuatable in a predetermined pattern to establish reverse, direct, first overdrive and second overdrive speed ratios between the output of said converter and the input to said fixed reduction gearing, actuating means for said brakes and said clutches, shiftable control means for said actuating means and an arrangement of said control means operative to establish reverse, direct, first overdrive and second overdrive ratios when said control means is shifted sequentially.

13. In power transmissions, an engine shaft and a load shaft, a variable speed ratio driving mechanism coupling said shafts, a concentric arrangement of driving units of said driving mechanism comprising a primary fixed reduction gear unit, a fluid torque converter, having an input impeller driven by said unit and an output rotor, selective variable speed ratio gearing unit driven by said output rotor providing selection of direct and plural overspeed step ratios, said unit consisting of input and output members coupled by gearing having a plurality of reaction members and a plurality of coupling clutches for delivering torque to said output member, a final reduction gear unit connected for power drive by said unit and driving said load shaft, and control means for said reaction members and clutches of said unit operative to establish said selected step speed ratios while maintaining continuous torque between said shafts.

14. In the construction set forth in claim 13, the sub-combination of fluid pressure actuated means for said reaction members and said clutches to establish the selected step speed ratios of said gearing unit, and of valves embodied in said control means arranged to be positioned in a predetermined pattern of ratio selection, involving the utilization of three effective positions for each of said valves.

15. In power transmissions, an engine, an engine shaft, a casing attached to said engine, a primary fixed reduction gear unit consisting of an annulus gear connected to said engine shaft, a sun gear attached to the said casing, and a set of planet gears mounted on a carrier integral with an output shaft, rotated by this arrangement at a fixed reduced speed ratio to that of said engine shaft, a fluid torque converter assembly composed of an input impeller fastened to the output shaft of said primary gear unit, a set of reaction blades fixed to said casing and an output rotor, this assembly providing torque multiplication over the speed range provided by said primary unit from said engine; a variable speed gearing having an input planetary carrier rotating with said rotor, compound sun and annulus gears with reaction brake drums, coupling clutches and an output shaft driven by sun gear elements of said compound sun and annulus gears; said gearing being arranged to provide reverse, direct and two distinct overdrive speed ratios by braking of said drums and by engagement of said clutches, brakes for said drums, a final drive reduction gear unit with its input gear rotating with said last named output shaft, and its output gear arranged to drive said load shaft, and actuating means for said brakes and said clutches arranged to apply said brakes alternately for establishing one or the other of said overdrive speed ratios while one of said coupling clutches is engaged.

16. In power transmissions, an input shaft connected to a variable speed gearing unit which includes two coupling clutches for obtaining variable speed ratios therein, said clutches having common external connection but each having an independently rotatable hub, an output shaft, a drum attached to said output shaft and enclosing said clutches, fluid pressure cylinders formed in said drum, a pair of annular pistons in said cylinders for actuating said clutches under fluid pressure admitted to said cylinders, two fluid pressure passages formed in said drum leading to said cylinders, one for actuating each piston, a solid shaft driven by an element of said gearing unit and connected to one of said clutch hubs, a hollow shaft surrounding a portion of said solid shaft and connected to the other of said clutch hubs, a supporting sleeve external to said shafts and adjacent one end of said drum, fluid pressure feed means in said sleeve and connected to said passages, and control means external to said fluid feed means operative to direct fluid pressure selectively or simultaneously to said passages for causing engagement of one or both of said clutches or for causing release of both clutches.

17. In power transmissions, power and load shafts, a variable speed driving mechanism which includes the serial arrangement between said power and said load shafts of a primary fixed ratio gear unit, a fluid torque converter, having an input impeller driven constantly by said unit and having an output rotor, a selective step ratio gearing unit with a power input member attached to said rotor, said unit having a power output member coupled to the drive of said input member by a plurality of gear elements and including gear reaction and clutch coupling members the arrangement providing a plurality of forward overspeed ratios and reverse drive, and a final-drive fixed ratio unit driven by said output member and driving said load shaft, actuation means for determining the plurality of step ratios provided by said gearing unit, including brake means for said reaction members and clutch means for said coupling members, and operating controls for said actuation means characterized by a linkage arrangement which is effective to produce a range of forward driving speed ratios by said gearing unit while maintaining uninterrupted torque between said shafts.

18. In power transmissions, an engine, a speed control for said engine, an engine shaft and a load shaft, a fluid torque converter driven by said engine shaft and driving a variable speed gearing unit embodying a plurality of reaction elements and providing reverse and a plurality of forward speed ratios, a drum adapted to be driven by said gearing unit and connected to drive said load shaft, a coupling clutch connecting said drum with a reaction element of said gearing unit and arranged to be actuated during reverse and during the lowest speed ratio forward drive, actuating means for said clutch, control means for said transmission effective to cause actuation of said clutch when set for reverse drive by said unit and likewise when set for one of said forward speed ratios and operating means for said speed control and said control means such that an operator by predetermined operation of said speed control for said engine is enabled to shift said control means and thereby said actuating means freely between forward and reverse without release of the said clutch during the transition interval between these speed ratios.

19. In power drive mechanisms for providing continuous torque over a range of driving speed ratios between a variable torque engine shaft and a load shaft, the combination of a fluid torque converter driven by the said engine shaft effective to transmit multiplied torque over a range of speeds and torques and having an output shaft coupled to the input shaft of a variable speed ratio gear unit consisting of power input and output members coupled by gear elements with torque reaction-supporting members and clutch coupling members, said unit being equipped with speed ratio determining friction members for said reaction and coupling members actuable in a predetermined pattern to provide a sequential selection of forward drives between the said transmission input shaft and the said load shaft consisting of direct, a first overspeed and a second overspeed, the transitions between said forward drive ratios being accomplished while maintaining continuous torque between said engine and said load shafts, the said fluid torque converter automatically changing ratio in accordance with output torque inversely to the changes in said variable speed ratio gear, such that the said transitions between direct and first overspeed, or between first and second are achieved while the net overall torque between the said engine and said load shaft remains at a given value.

20. In power drive mechanisms, an arrangement of power devices connected in series, consisting of a variable torque engine, a fluid torque converter providing automatic variations in multiplied torque in accordance with the speed and load applied to the said converter, the said converter having an input impeller and an output rotor; and a variable step ratio gearing unit driven by a fixed connection from said rotor, said unit consisting of input and output members coupled by gear elements with torque-reaction sustaining members and with torque-coupling clutch members, the arrangement thereof being adapted to yield changes of ratio obtained by friction actuators operable on said reaction sustaining and torque coupling members to maintain torque during said ratio changes, the assembly driving a load shaft power-operated means adapted to energise said friction actuators, and control mechanism for said power-operated means providing a predetermined pattern for energising said friction actuators effective to establish said changes of ratio by said gearing resulting in automatic inverse changes of multiplied torque by said torque converter such that for a predetermined step ratio change in said gearing, the overall torque between said engine and said load shaft remains approximately constant.

OLIVER K. KELLEY.

REFERENCES CITED

The following references are of record in the file of this patent:

UNITED STATES PATENTS

| Number | Name | Date |
|---|---|---|
| 2,235,370 | Jandasek | Mar. 18, 1941 |
| 2,100,191 | Lapsley | Nov. 23, 1937 |
| 2,134,398 | Cotterman | Oct. 25, 1938 |
| 2,144,795 | Cotterman | Jan. 24, 1939 |
| 2,205,794 | Jandasek | June 25, 1940 |
| 2,241,764 | Bollinger | May 13, 1941 |
| 2,325,876 | Pollard | Aug. 3, 1943 |
| 2,221,393 | Carnegie | Nov. 12, 1940 |
| 1,609,782 | Small | Dec. 7, 1926 |
| 2,308,547 | Schneider | Jan. 19, 1943 |
| 2,351,213 | James | June 13, 1944 |